United States Patent
Schmidt et al.

(10) Patent No.: US 8,204,230 B2
(45) Date of Patent: Jun. 19, 2012

(54) COMMUNICATION DEVICE, METHOD FOR ESTABLISHING A COMMUNICATION CONNECTION AND METHOD FOR USING A COMMUNICATION CONNECTION

(75) Inventors: Andreas Schmidt, Braunschweig (DE); Norbert Schwagmann, Braunschweig (DE); Achim Luft, Braunschweig (DE); Michael Benkert, Burgdorf-Hohenassel (DE)

(73) Assignee: Infineon Technologies AG, Neubiberg (DE)

( * ) Notice: Subject to any disclaimer, the term of this patent is extended or adjusted under 35 U.S.C. 154(b) by 1023 days.

(21) Appl. No.: 11/745,807

(22) Filed: May 8, 2007

(65) Prior Publication Data

US 2008/0279158 A1 Nov. 13, 2008

(51) Int. Cl.
*H04L 9/08* (2006.01)
(52) U.S. Cl. ........ 380/278; 455/410; 455/436; 380/277; 380/279; 380/280; 380/282; 380/283; 370/337; 370/329; 709/223; 709/209
(58) Field of Classification Search .................. 455/410, 455/436; 370/254, 337, 310; 709/223, 209; 702/204; 380/277–283
See application file for complete search history.

(56) References Cited

U.S. PATENT DOCUMENTS

| | | | |
|---|---|---|---|
| 6,901,057 B2 * | 5/2005 | Rune et al. | 370/310 |
| 6,901,275 B1 * | 5/2005 | Aoyagi | 455/574 |
| 7,146,636 B2 * | 12/2006 | Crosbie | 726/7 |
| 2002/0055978 A1 * | 5/2002 | Joon-Bo et al. | 709/209 |
| 2002/0075940 A1 * | 6/2002 | Haartsen | 375/132 |
| 2002/0085719 A1 * | 7/2002 | Crosbie | 380/248 |
| 2003/0088772 A1 * | 5/2003 | Gehrmann et al. | 713/175 |
| 2005/0086273 A1 * | 4/2005 | Loebbert et al. | 707/204 |
| 2006/0128305 A1 * | 6/2006 | Delalat | 455/41.2 |
| 2006/0246946 A1 * | 11/2006 | Moritomo et al. | 455/557 |
| 2007/0043844 A1 * | 2/2007 | Sakai | 709/223 |
| 2007/0109989 A1 * | 5/2007 | Nakagawa et al. | 370/328 |
| 2007/0223398 A1 * | 9/2007 | Luo et al. | 370/254 |
| 2008/0146343 A1 * | 6/2008 | Sullivan et al. | 463/42 |
| 2009/0028341 A1 * | 1/2009 | Hamachi | 380/278 |

FOREIGN PATENT DOCUMENTS

WO   WO 2005107162 A1 * 11/2005

* cited by examiner

*Primary Examiner* — Jean Gelin
*Assistant Examiner* — Nathan Taylor
(74) *Attorney, Agent, or Firm* — Dickstein Shapiro LLP (57) ABSTRACT

A communication device including a communication connection establishing circuit configured to establish an ad hoc network communication connection between the communication device, a second communication device and a third communication device, a generating circuit configured to generate encryption parameters to be used by the second communication device and the third communication device for encrypting and decrypting data transmitted between the second communication device and the third communication device via the communication connection when the first communication device has left the communication connection, a signaling circuit configured to signal the encryption parameters to the second communication device and the third communication device, and a disconnection circuit configured to remove the communication device from the communication connection.

18 Claims, 9 Drawing Sheets

COMMUNICATION DEVICE, METHOD FOR ESTABLISHING A COMMUNICATION CONNECTION AND METHOD FOR USING A COMMUNICATION CONNECTION

BACKGROUND

Embodiments of the present invention relate generally to communication devices, method for establishing a communication connection and method for using a communication connection.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

According to one embodiment of the invention, a communication device is provided comprising a communication connection establishing circuit configured to establish an ad-hoc network communication connection between the communication device, a second communication device and a third communication device, a generating circuit configured to generate encryption parameters to be used by the second communication device and the third communication device for encrypting and decrypting data transmitted between the second communication device and the third communication device via the communication connection when the communication device has left the communication connection, a signalling circuit configured to signal the encryption parameters to the second communication device and the third communication device, and a disconnection circuit configured to remove the communication device from the communication connection.

According to another embodiment of the invention, a communication device is provided comprising a communication connection establishing circuit configured to establish an ad hoc network communication connection between the communication device, a second communication device and a third communication device, a receiving circuit configured to receive encryption parameters to be used by the communication device and the second communication device for encrypting and decrypting data transmitted between the communication device and the second communication device via the communication connection when the third communication device has left the communication connection from the third communication device, and an encrypting/decrypting circuit configured to encrypt data to be sent to the second communication device via the communication connection using the encryption parameters and to decrypt data received from the second communication device via the communication connection using the encryption parameters when the third communication device has left the communication connection.

According to other embodiments of the invention, methods according to the communication devices described above are described.

Illustratively, according to embodiments of the invention, a communication device generates encryption parameters for a communication connection between three (or more) communication devices and removes itself from the communication connection. The remaining communication devices use the encryption parameters for encrypting/decrypting data transmitted via the communication connection.

In case of Bluetooth, the encryption parameters are for example a master key generated by a master of the communication connection. The master signals the master key to the other communication devices and performs a role switch procedure with one of the other communication devices, i.e. hands over the master role to one of the other communication devices and leaves the communication connection, which in case of Bluetooth is for example a piconet.

For example, the communication device which is used to connect two low-functionality communication devices may have an intermediation state in which it carries out a procedure to establish a secure connection between the two low-functionality communication devices.

According to embodiments of the invention, it is possible to establish a secure connection between two communication devices with low functionality, for example without the functionality to input a PIN (personal identification number) which is used for encryption key generation, or which do not comprise a random number generator, a display or a keyboard. Such two communication devices with low functionality are for example a printer and a camera, a speaker and a headset or an actor and a sensor in a home automation system.

A memory used in the embodiments of the invention may be a volatile memory, for example a DRAM (Dynamic Random Access Memory) or a non-volatile memory, for example a PROM (Programmable Read Only Memory), an EPROM (Erasable ROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

A circuit can be a hardware circuit designed for the respective functionality or also a programmable unit, such as a processor, programmed for the respective functionality.

Nowadays, what is referred to as Bluetooth technology is becoming increasingly established for the local networking of small mobile electronic devices such as, for example, mobile radio telephones or what are referred to as personal digital assistants (PDAs), as well as computers and peripheral devices, for example a computer mouse or a keyboard. Bluetooth is an industrial standard for the wireless radio networking of devices over a relatively short distance.

The physical layer of Bluetooth operates in the ISM frequency band (ISM: industrial, scientific, medical), i.e. in a frequency range between 2.402 GHz and 2.480 GHz. A frequency hopping method is used to avoid interference and transmission errors. A binary frequency modulation method is used to achieve a low complexity of the Bluetooth transceiver and the Bluetooth receiver. The symbol rate of a Bluetooth transmission is 1 mega symbol per second (Ms/s). Thus, a bit rate of 1 megabit per second (Mbit/s) can be achieved.

A physical channel is used by a plurality of Bluetooth devices simultaneously which are synchronized by a common clock and a common frequency hopping pattern. One of the devices (which is denoted as master) sets the synchronisation reference. A master and one or more other devices communicating with each other and the master (denoted as slaves) form a so called Piconet. The frequency hopping pattern is determined by an algorithm from parts of the Bluetooth specification address and the current clock of the master. The actual frequency pattern is generated from a sequence of 79 frequencies of the ISM frequency band by means of a pseudo random number generator (typically implemented using a feedback shifting register).

When there is interference in some frequencies due to other electronic devices these frequencies can be left out from the frequency hopping pattern. The frequency hopping adapted in this way improve the coexistent of Bluetooth transmissions and other electronic devices which operate in the same frequency band and are located in the vicinity of the Bluetooth devices. A bluetooth piconet according to an embodiment of the invention is shown in FIG. 1.

Figure 1:
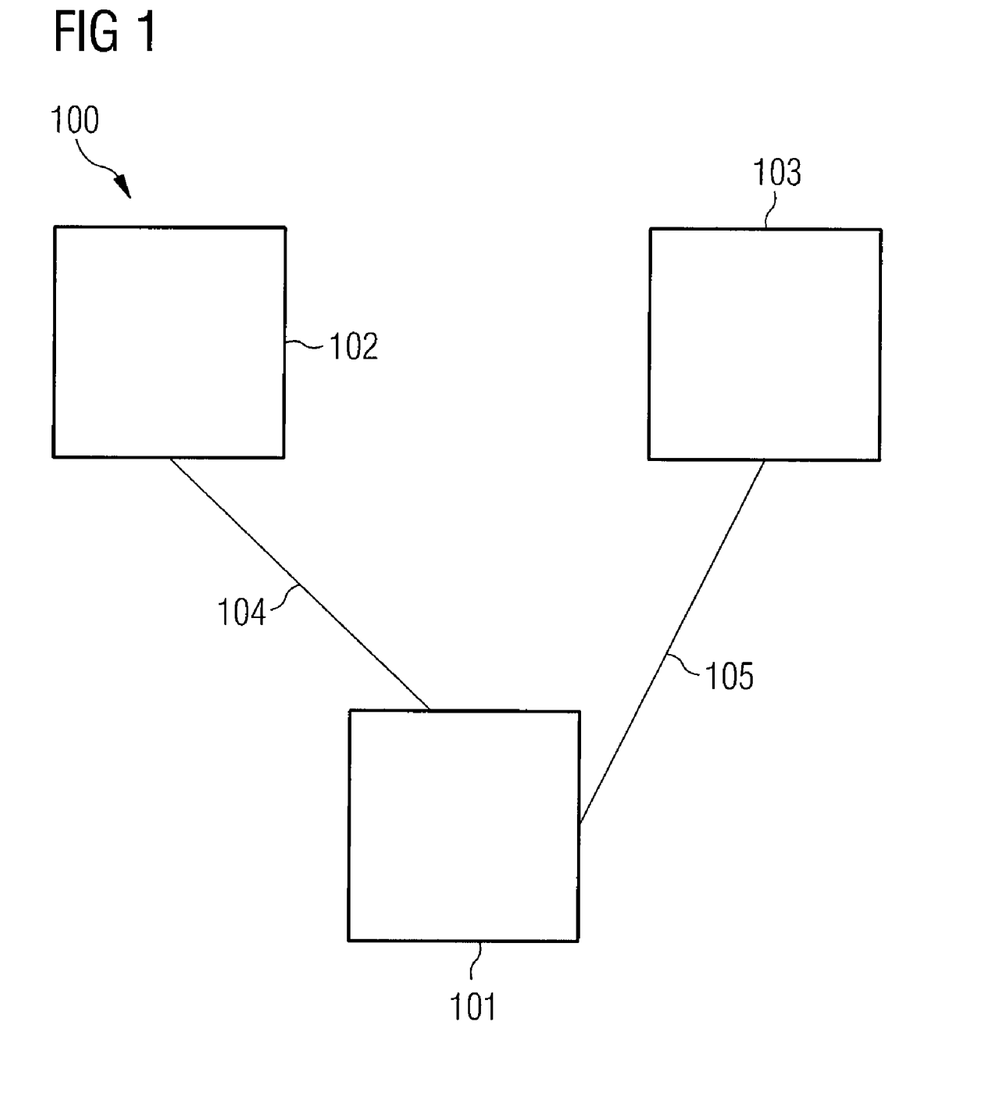
FIG. 1 shows a communication arrangement according to an embodiment of the invention.

FIG. 1 shows a communication arrangement 100 according to an embodiment of the invention.

The communication arrangement 100 comprises a first Bluetooth device 101, a second Bluetooth device 102 and a third Bluetooth device 103. In the following, it is assumed that the first Bluetooth device 101, the second Bluetooth device 102 and the third Bluetooth device 103 have a Bluetooth communication session wherein the first Bluetooth device 101 acts as master and the second Bluetooth device 102 and the third Bluetooth device 103 act as slaves.

The Bluetooth devices 101, 102, 103 communicate using a physical channel wherein data transmissions are carried out in time slots. Data are exchanged between the Bluetooth devices 101, 102, 103 within these time slots in data packets. Above the physical layer providing the physical channels for the communication session, there are higher communication layers for providing the communication session, for example providing logical channels.

The Bluetooth devices 101, 102, 103 form a piconet. There exists a physical communication connection (physical channel) 104, 105 between each slave 102, 103 and the master 101. It is not necessary that there is a physical communication connection between the slaves 102, 103. A physical communication connection (physical channel) serves as a transport means for one or more logical communication connections which may support synchronous, asynchronous or isochronous point to point communication connections and broadcast communication connections.

Control messages for the baseband layer and the physical layer (also called radio layer in Bluetooth) are transmitted in addition to user data via the logical communication connections. The control messages are formed according to a control protocol denoted as link manager protocol (LMP).

Each Bluetooth device 101, 102, 103 has at least one asynchronous connection-oriented logical communication connection for transmitting the LMP protocol messages. Transmission via this communication connection is denoted as ACL transmission and the communication connection is established by the respective Bluetooth device 101, 102, 103 when it enters the piconet.

Above the baseband layer (which is itself located above the physical layer) the L2CAP layer is located. It is a channel based abstraction layer for applications and services. Applications can transmit data by means of the L2CAP protocol using any logical connection supporting the L2CAP protocol. The mentioned communication layers are shown in FIG. 2.

Figure 2:
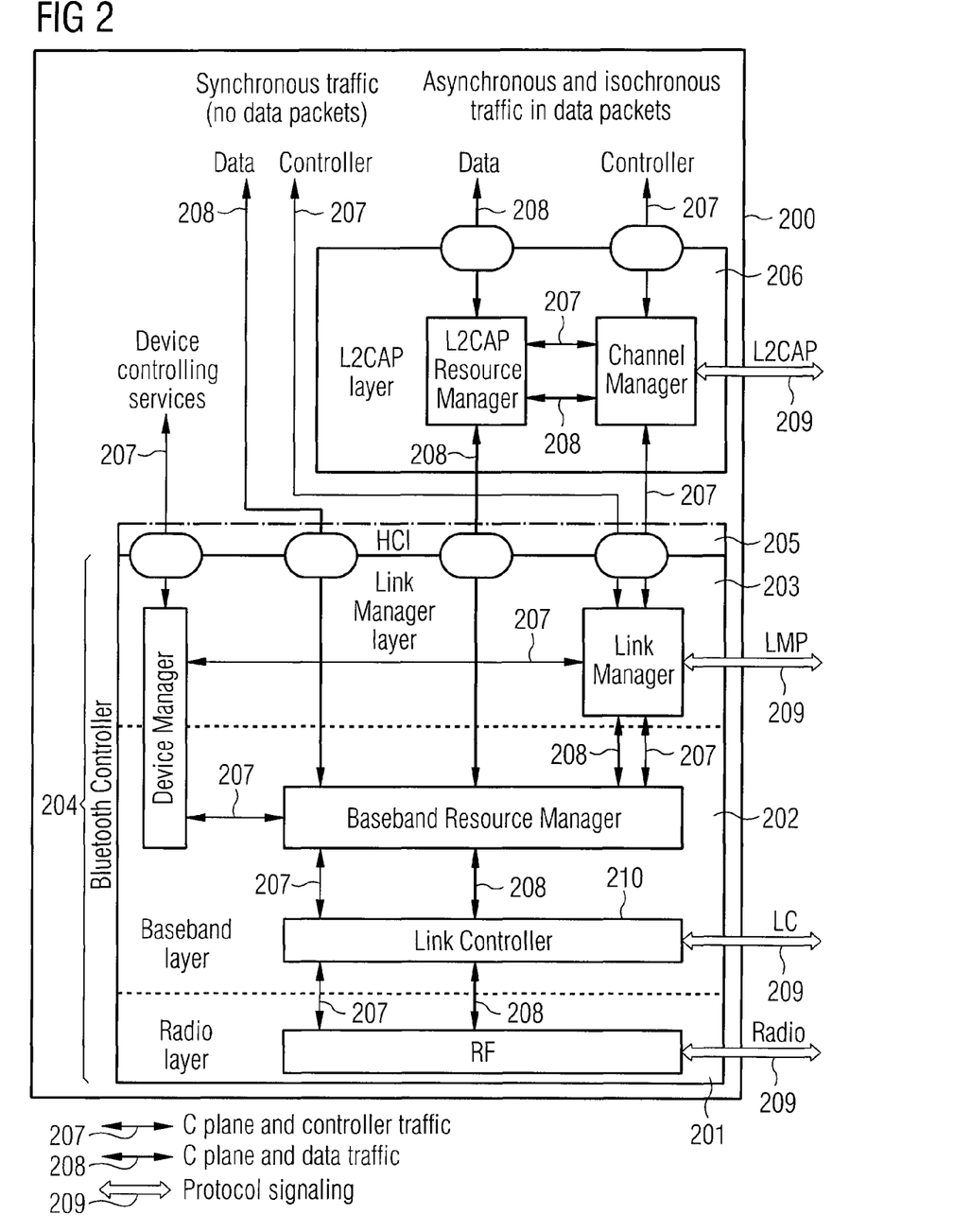
FIG. 2 shows a protocol layer diagram according to an embodiment of the invention.

The lower protocol layers of the Bluetooth architecture according to one exemplary embodiment of the invention are illustrated in FIG. 2 in a protocol layer diagram 200.

The three lower communication protocol layers (physical layer, also referred to as radio layer 201 according to Bluetooth; data link layer, also referred to as baseband layer 202 according to Bluetooth, and the network layer, also referred to as link management layer 203 according to Bluetooth) are combined according to this exemplary embodiment of the invention to form a subsystem 204, which is also referred to as "Bluetooth controller".

The baseband layer 202 comprises a link controller 210 may encrypt data to be transmitted if this is desired and decrypts encrypted data received. It may also generate signals for flow control, for acknowledgments and for re-transmission requests.

The transport layer above the Bluetooth controller 204 is terminated according to Bluetooth by the optional "host to controller interface" (HCI interface) 205 which is shown in FIG. 2. The HCI interface 205 serves as a service access point to the Bluetooth controller 204 in the Bluetooth architecture according to the exemplary embodiments of the invention.

Above the HCI interface 205 a session layer which is referred to as a logical link control and adaptation protocol layer 206 (L2CAP layer) is provided.

The L2CAP layer 206 is used, according to the exemplary embodiments of the invention, in ACL communication links but it is not used for SCO communication links which are aimed at ensuring an efficient voice transmission with a constant data rate of usually 64 kbit/s. According to the illustrated Bluetooth architecture, the strict division of the ISO/OSI model is not always complied with.

In the general Bluetooth architecture such as is provided according to the exemplary embodiments of the invention, parts of the network layer also extend into the transport layer. The presentation layer and the application layer are not shown in FIG. 2 for reasons of simpler illustration. Control signals 207 are represented in FIG. 2 by thin connecting arrows and form the control plane (C plane) while the data signals 208 are represented by thicker connecting arrows in FIG. 2, the data signals forming the user plane (U plane).

Interoperability in Bluetooth is ensured by the fact that on the one hand, a clean interface is defined between the Bluetooth controller 204 (communication protocol layers extending downwards from the link management layer 203) and the "Bluetooth host" (the layers extending upwards from the L2CAP layer 206) within a Bluetooth communication system (specifically the HCI interface 205), and, on the other hand, the exchange of protocol messages between identical layers of two different Bluetooth communication systems is regulated unambiguously, symbolized in FIG. 2 by means of communication connecting arrows 209.

Referring again to the piconet shown in FIG. 1, the master, i.e. the first Bluetooth device 101, controls the usage of the physical channel. The first Bluetooth device 101 only transmits in time slots with an even number. The slaves, i.e. the second Bluetooth device 102 and the third Bluetooth device 103, may only transmit response messages on the physical channel. The slaves 102, 103 may not be allowed to respond to a broadcast transmission.

Some time slots of the physical channel (also denoted as physical base channel) in the piconet may be reserved for transmission of a control signal which is used when a slave 102, 103 is in parked state. In this case the master 101 transmits a data packet in the reserved time slots which may be used by a parked slave 102, 103 to re-synchronise with the physical base channel. An example for the communication between the master 101 and one of the slaves 102, 103 is shown in FIG. 3.

Figure 3:
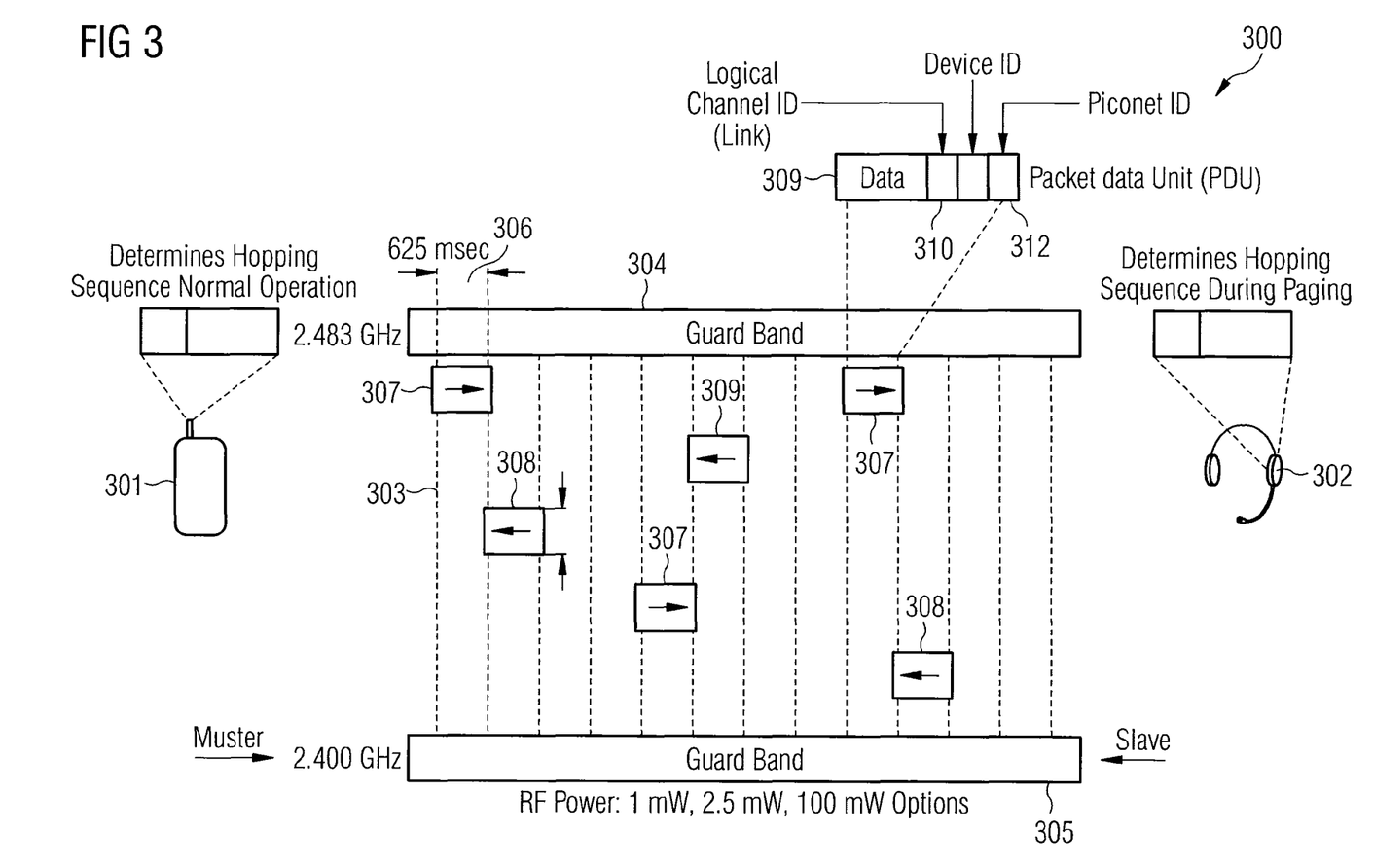
FIG. 3 shows a master slave communication according to an embodiment of the invention.

FIG. 3 shows a master slave communication 300 according to an embodiment of the invention.

The master slave communication 300 takes place between a master 301 and a slave 302. The master slave communication 300 uses a frequency band 303 between 2.400 GHz and 2.483 GHz (ISM frequency band) wherein two guard bands 304, 305 are used to avoid interference with neighboring frequency bands and are not used to transmit data.

The master slave communication 300 uses a physical channel divided into time slots 306 each having a length of 625 msec. The master 301 transmits a first plurality of data packets 307 to the slave 302 and the slave 302 responds to the first plurality of data packets 307 by sending a second plurality of data packets 308 to the master 301. A data packet 307, 308 comprises data 309, a logical channel identification 310, a device identification 311 and a piconet identification 312.

The master 101 and one of the slaves 102, 103 may change their roles in the piconet. This means that the master 101 becomes a slave and the slave 102, 103 becomes the master. This is called role switch procedure. In the role switch procedure, it is switched from the physical channel defined by the master 101 to the physical channel defined by the slave 102, 103 which is going to be the master. The logical ACL connections are copied to the physical channel defined by the slave 102, 103 which is going to be the master. Further logical connections are not copied in one embodiment of the invention and are for example established in accordance with higher communication layers. In one embodiment, a Bluetooth device 101, 102, 103 may not take part in a role switch procedure when it is in a power saving mode. Further, the Bluetooth device 101, 102, 103 may not have a synchronous communication connection when taking part in a role switch procedure according to one embodiment of the invention.

A user may safely connect two or more of his Bluetooth devices 101, 102, 103 according to a so-called pairing. After a successful pairing of the Bluetooth devices 101, 102, 103 the Bluetooth devices 101, 102, 103 may use each other services. For pairing of Bluetooth devices 101, 102, 103 the user is asked to authorise the connection by means of a personal identification number (PIN). The PIN is an alpha numeric sequence comprising four to eight symbols. Typically it is recommended that a user uses his PIN only with trusted persons for pairing trusted Bluetooth devices 101, 102, 103.

A pairing is not allowed without a PIN in one embodiment of the invention. The PIN is for example freely chosen by the user. For relatively simple Bluetooth devices, like for example a headset, it may also be preset by the manufacturer of the Bluetooth device.

A Bluetooth device 101, 102, 103 may be in different states. Examples for such states are shown in FIG. 4.

Figure 4:
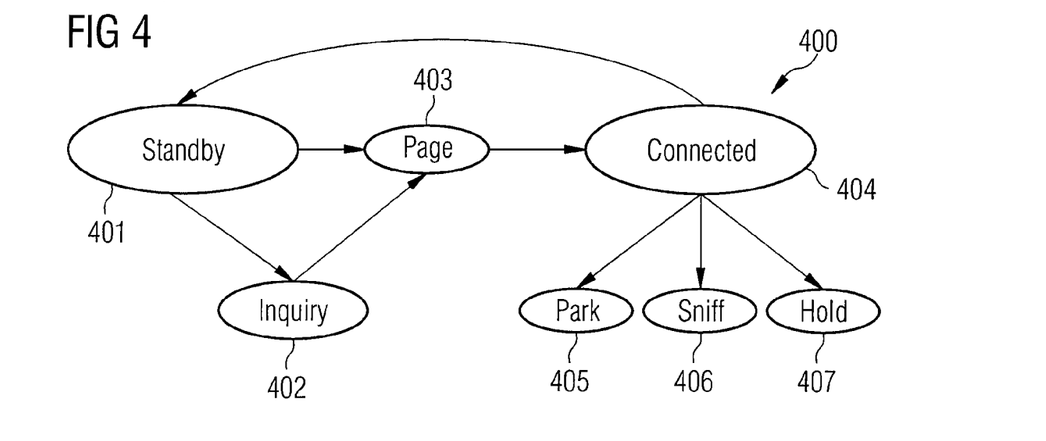
FIG. 4 shows a state diagram according to an embodiment of the invention.

FIG. 4 shows a state diagram 400 according to an embodiment of the invention.

When a Bluetooth device 101, 102, 103 is switched on, it is in stand-by state 401. In the stand-by state 401, the clock of the Bluetooth device 101, 102, 103 is running. When a connection is to be established, the Bluetooth device 101, 102, 103 switches to inquiry state 402 or page state 403. In the inquiry state 402 the Bluetooth device 101, 102, 103 searches for other Bluetooth devices 101, 102, 103. To be found, the other Bluetooth devices 101, 102, 103 have to be in inquiry scan state (not shown). When the Bluetooth device 101, 102, 103 is in the page state 403, it may directly initiate the communication with a Bluetooth device 101, 102, 103 in page scan state. Via the page state 403, the Bluetooth device 101, 102, 103 may switch from the stand-by state 401 to the connected state 404. In the connected state 404, data may be exchanged with other Bluetooth devices 101, 102, 103. Further, the Bluetooth device 101, 102, 103 may switch to park state 405, sniff state 406, or hold state 407 which are power saving modes from the connected state 404.

In the following, the establishment of a communication connection between two Bluetooth devices 101, 102, 103 in accordance with an embodiment of the invention is explained with reference to FIG. 5.

Figure 5:
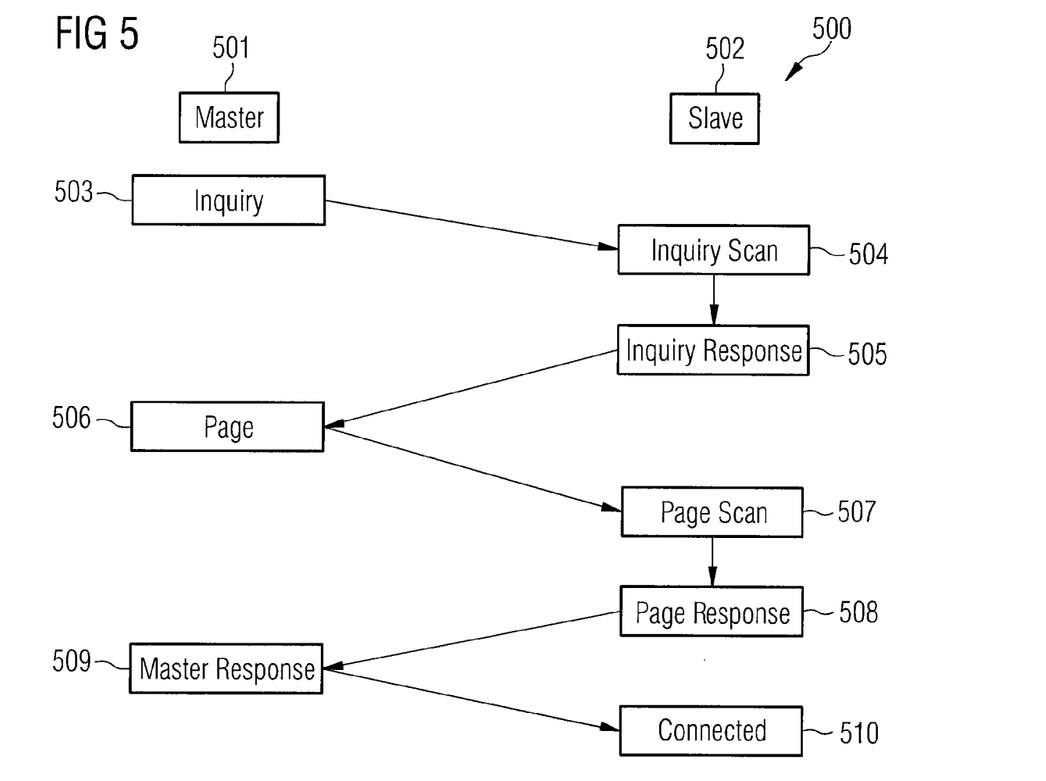
FIG. 5 shows a flow diagram according to an embodiment of the invention.

FIG. 5 shows a flow diagram 500 according to an embodiment of the invention.

The Bluetooth device initiating the establishment of the communication connection between the two Bluetooth devices is master 501 of the resulting piconet while the other Bluetooth device is slave 502 of the resulting piconet.

The master 501 controls the usage of the physical channel for the communication connection in the resulting piconet. For example, the slave 502 will use the clock signal and the hopping sequence of the master 501.

The master 501 may search for other Bluetooth devices in inquiry state 503. When the slave 502 detects in inquiry scan state 504 that the master 501 is searching for other Bluetooth devices it may send an inquiry response to the master 501 in 505. After that, the slave 502 is known to the master 501 and the master 501 may establish a communication connection to the slave 502 from page state 506.

In page state 506, the master 501 sends the device access code (DAC) for 10 ms at 3200 hops/s (frequency hops per second). The DAC is determined from the Bluetooth device address (ADDR) of the master 501. The slave 502 listens in page scan state 507 on all page frequencies for 11.25 ms for page messages. When the slave 502 receives the DAC it sends a page response 508 comprising its Bluetooth device address. After that, the master 501 sends a master response 509, comprising a frequency hop synchronisation (FHS) packet. The slave 502 switches to connected state 510, sends an acknowledgment message (ACK) to the master 501 and switches to the frequencies and the clock signal to be used as defined by the master 501. Further, the established communication connection may be checked using a poll message answered by a response message.

The inquiry state 503 is used by the master 501 to search for the slave 502 when it is not known to the master 501. As mentioned above, to be found, the slave 502 must be in inquiry scan state 504. The master 501 sends inquiry messages for 10 ms at 3200 hops/s. This is repeated for 256, 512 or 768 times. The slave 502 in inquiry scan state 504 listens on the inquiry frequencies for 10.625 ms for inquiry messages. The inquiry response 505 comprises the DAC determined from the Bluetooth device address of the slave 502.

For the security of the communication between the master 501 and the slave 502, two different types of cryptographic keys are used: the link key which is used for authentication and the encryption key for encrypting data to be transmitted.

Three different modes of security may be supported:
mode 1: no security
mode 2: service specific security on application layer
mode 3: link specific security.

In mode 3, when a communication connection is established, the participating Bluetooth devices automatically authentificate each other.

The authentification has two phases:
the initialization phase in which the link key is generated
the authentification between two or more Bluetooth devices.

After the authentification the participating Bluetooth devices may negotiate an encryption key.

The initialization phase comprises two steps: the generation of the initialization key and the generation of the link key. The initialization key (denoted by $K_{init}$) has a length of 128 bit and is used for the security of the communication between the participating Bluetooth devices during the initialization phase. Its generation is shown in FIG. 6.

Figure 6:
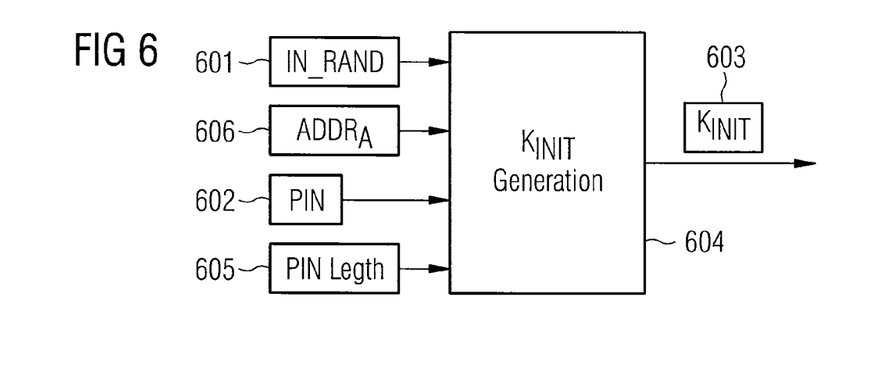
FIG. 6 illustrates the generation of an initialization key according to an embodiment of the invention.

FIG. 6 illustrates the generation of an initialization key according to an embodiment of the invention.

The generation of the initialization key is initiated by the master 501 by the command LMP_in_rand which transmits a random value 601 denoted by IN_RAND to the slave 502. From the random value 601 and the PIN 602 of the master 501 the initialization key 603 is generated which is symbolized in FIG. 6 by block 604. There may also be used the length 605 of the PIN and the Bluetooth device address 606 of the master 501. As mentioned above the PIN may be preset in the master 501 (fixed pin) or may be freely chosen by the user (variable pin).

The exchange of a PIN between a first Bluetooth device and a second Bluetooth device is for example carried out according to the following flow:
1. First Bluetooth device starts authorization_requested command
2. Second Bluetooth device receives a PIN_code_request_event message
3. Second Bluetooth device sends a PIN_code_request_reply message
4. First Bluetooth device receives an authentication_complete_event message.

Four different types of link keys may be used which differ from each other in the way of their generation:

Unit key: The unit key is generated when a low-function Bluetooth device is produced and is permanently stored in the Bluetooth device. The unit key is used for Bluetooth devices for which a complex key management would be inefficient.

Initialization key: There exist the possibility that the initialization key $K_{init}$ generated in the initialization phase is also used as link key.

Combination key: The combination key is the XOR combination of two keys which are each generated from a random number and the respective Bluetooth device address.

Master key: The master key is used as an alternative to the case that a point to multipoint communication (broadcast) in a piconet is secured with high effort using a plurality of different link keys. The master key gives the opportunity to use a temporary shared authentification and an encryption key. For example, the master key replaces the link keys only for a limited time. The exchange of the master key is carried out by a secured transmission (for example by a XOR combination with a temporary overlay key) from the master to the slaves.

Which of the above key types is used as a link key may be decided depending on the capacities of the participating Bluetooth devices and the respective purpose. Which link key is used is negotiated between the participating Bluetooth devices in the initialization phase.

After the initialization phase, a challenge response method is carried out for authentification using the link key generated in the initialization phase as a symmetric key. The authentification method is illustrated in FIG. 7.

Figure 7:
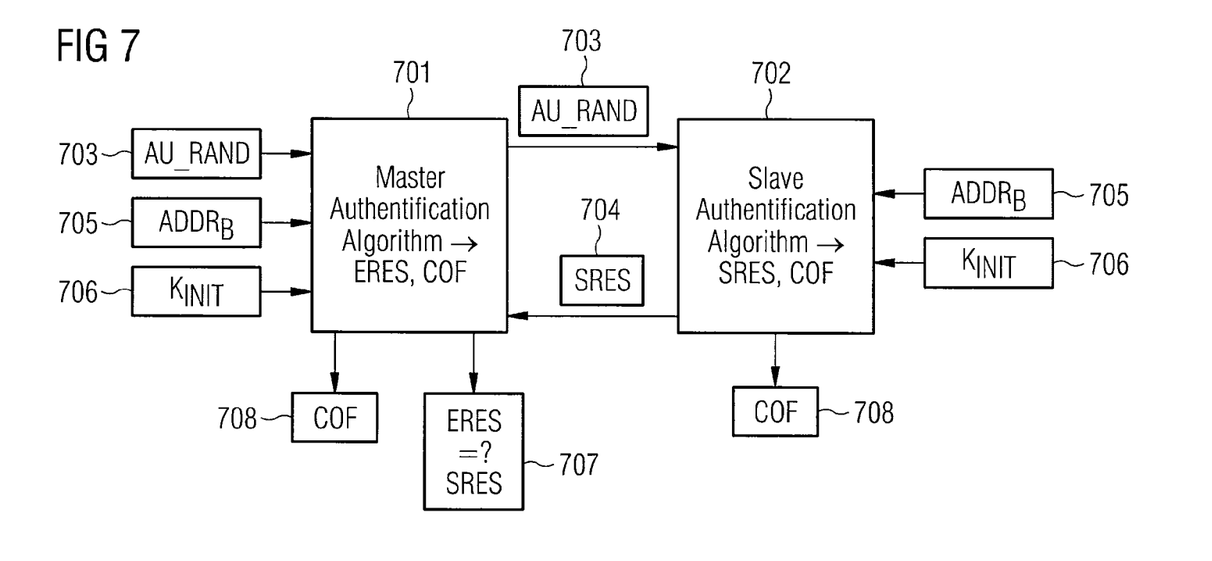
FIG. 7 illustrates an authentification method according to an embodiment of the invention.

FIG. 7 illustrates an authentification method according to an embodiment of the invention.

The authentification takes place between a master 701 and a slave 702. The authentification is initiated by the master 701 using the command LMP_au_rand. The master 701 generates a random number 703 denoted by AU_RAND which is transmitted to the slave 702 as challenge. The slave 702 determines a signed response (SRES) 704 from the random number 703, its Bluetooth device address 705 (denoted by $ADDR_B$) and the link key 706. The signed response 704 which has length of 32 bit is send to the master 701 using the command LMP_sres.

The master compares the signed response 704 with an expected response calculated by the master 701. This is illustrated by block 707.

For a mutual authentification the process is initiated a second time, this time by the slave 702. During the authentification, a ciphering offset (COF) 708 is generated by the master 701 and the slave 702 from the same input values. The ciphering offset 708 is used for the determination of the encryption key.

Figure 8:
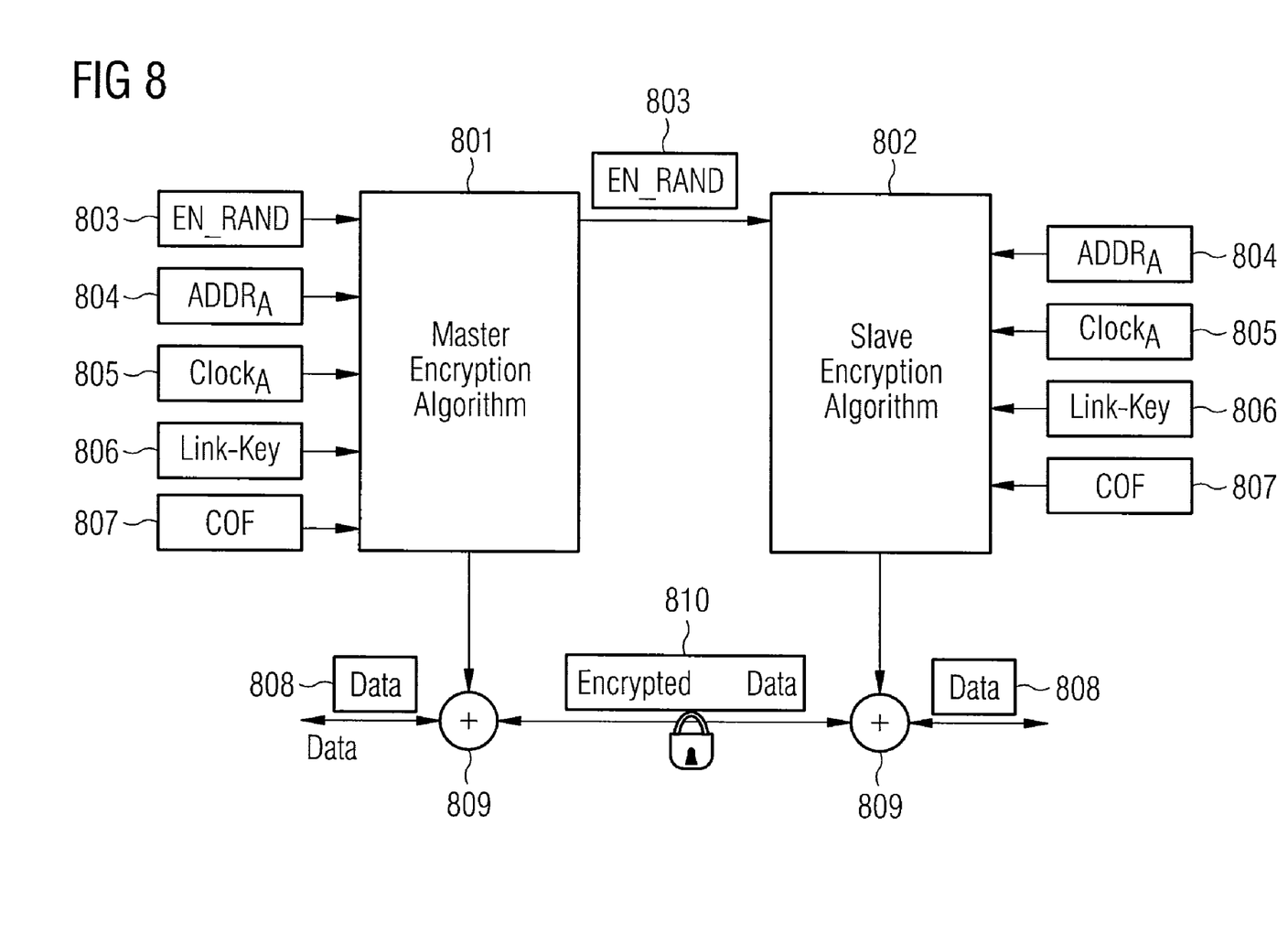
FIG. 8 illustrates the generation and usage of an encryption key according to an embodiment of the invention.

The generation and usage of the encryption key is illustrated in FIG. 8.

FIG. 8 illustrates the generation and usage of an encryption key according to an embodiment of the invention.

Analogously to FIG. 7, the encryption key is generated and used by a master 801 and a slave 802. The encryption key is generated by both master 801 and the slave 802 using a random number 803 generated by the master 801 and transmitted to the slave 802, the Bluetooth device address of the master 804, the clock signal of the master 805, the link key 806, and the ciphering offset 807. Data 808 to be transmitted between the master 801 and the slave 802 are encrypted by encrypters/decrypters 809 to generate encrypted data 810 which are sent some there respected sender to the respective receiver. The encrypter/decrypter 809 of the respective receiver decrypts the received encrypted data to restore the data 808.

A Bluetooth device with low functionality may for example only have a button for entering the inquiry scan state. The Bluetooth device may then be found by another Bluetooth device with a higher functionality like for example a laptop or a PDA (personal digital assistant). It may be shown in the display of the other Bluetooth device that the Bluetooth device has been found and the user of the other Bluetooth device can initiate a communication connection by inputting the preset PIN of the low functionality Bluetooth device. The Bluetooth device can be added to the list of known Bluetooth devices on the other Bluetooth device by the user. It may happen that the Bluetooth device with low functionality may not be able to carry out the tasks for the establishment of communication connection by itself.

In one embodiment, to establish a connection between to Bluetooth devices which have limited functionality and for example have a fixed PIN (which is not adequate when high security of the connection is desired) and do not support the input of a PIN and do not support the display of Bluetooth devices found in inquiry state, a Bluetooth device with sufficient functionality to establish a communication connection, for example a Bluetooth device allowing the input of a PIN or supporting the display of Bluetooth devices found in inquiry state or known Bluetooth devices, establishes a piconet in which the Bluetooth device itself and the Bluetooth devices to be connected take part, generates encryption parameters (for example one or more encryption keys) which may be used for secure communication between the Bluetooth devices to be connected and leaves the piconet.

As an example it is assumed that the first Bluetooth device 101 in the FIG. 1 has sufficient functionality to establish a piconet and the second Bluetooth device 102 and the third Bluetooth device 103 are low functionality Bluetooth devices to be connected. The first Bluetooth device 101 is used to set up the communication connection between the second Bluetooth device 102 and the third Bluetooth device 103 but is not going to take part in the communication after the connection has successfully been set up. The initialization process and the establishment of a security context are carried out by the first Bluetooth device 101. After this, the second Bluetooth device 102 and the third Bluetooth device 103 (i.e. the slaves) are made known to each other, a new master is chosen among the slaves 102, 103 and a link key and an encryption key to be used in the connection is negotiated. After that, the first Bluetooth device 101 leaves the piconet and a secure connection between the second Bluetooth device 102 and the third Bluetooth device 103 remains. This is explained in more detail with reference to FIG. 9 in the following.

Figure 9:
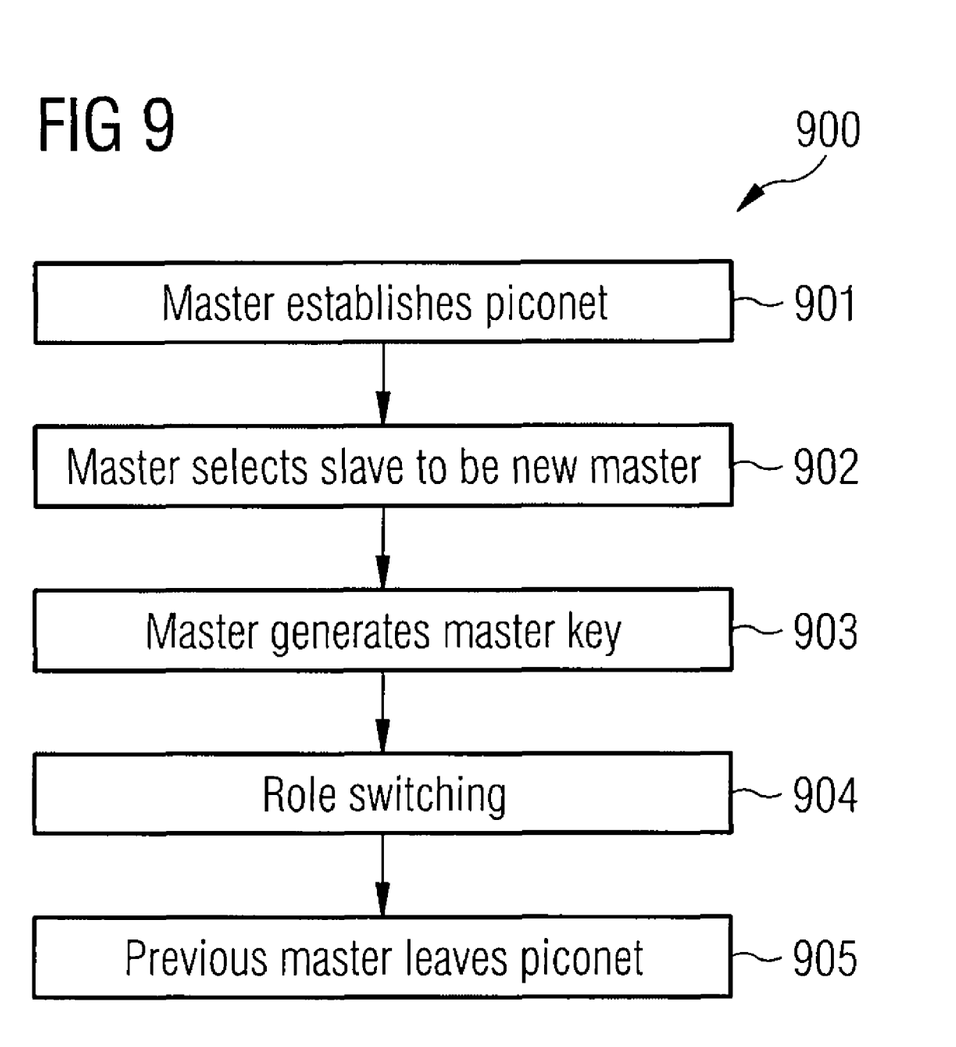
FIG. 9 shows a flow diagram according to an embodiment of the invention.

FIG. 9 shows a flow diagram 900 according to an embodiment of the invention.

In 901, the first Bluetooth device 101 starts the initialization procedure and the establishment of a piconet and is consequently going to be the master of the established piconet. The slaves 102, 103 are bit by bit added to the piconet during the initialization procedure and the authentification. It is assumed that the first Bluetooth device 101 is a Bluetooth device having sufficient functionality to establish a secure Bluetooth communication connection and for example supports variable PINs, random number generation and link keys according to the four types explained above.

In 902, when all Bluetooth devices 101, 102, 103 are part of the established piconet, the current master 101 selects one of the slaves 102, 103 which is going to be the new master. In 903, the master 101 generates two random numbers which it uses to generate a master key. The master 101 securely transmits the generated master key to the slaves 102, 103. By then, all Bluetooth devices 101, 102, 103 can be reached by this master key.

In 904, the current master 101 (in the following called old master) transfers the role of the master from itself to the slave selected to be the new master. For this, a role switching procedure is used in which the link specific security parameters (encryption parameters), for example the link key, are not re-negotiated but are defined by the master key generated by the old master 101. The copying of the base channel may be carried out according to the conventional role switching procedure.

In one embodiment, no further logical connections are established until this time in the piconet such that there is no need to re-establish them with the help of higher communication layers.

In 905, the first Bluetooth device 101 (old master) leaves the piconet when the new master has acknowledged the transfer of the master role.

The role switching finishes the link key negotiation. For the new master the other remaining Bluetooth device of the piconet is a slave that is already authentificated. The new master 102, 103 sends a frequency hop synchronisation (fhs) packet to the remaining slave which uses the clock of the new master and the frequency hopping sequence of the new master for the communication that follows.

The master key generated by the old master 101 is used as link key in the following communication between the second Bluetooth device 102 and the third Bluetooth device 103. As explained above with reference to FIG. 8, the encryption of the data to be transmitted may also be based on the current clock of the master to which all slaves are synchronised. Since the slave does not have a link key which was negotiated with the new master no command is sent to use a link key provided by the new master.

However, the negotiation of a new link key may be triggered if it is desired to use a different key than the master key generated by the old master.

As an example for the above procedure, it is assumed that the second Bluetooth device 102 is a window sensor and the third Bluetooth device 103 is a heating control actuator which should be connected. It may be desired to use Bluetooth devices in this application scenario because no cabling is necessary in this case.

The second Bluetooth device 102 and the third Bluetooth device 103 have for example only a button to switch into the inquiry scan state and a LED (light emitting diode) as operating mode display. For example, the LED of one of the Bluetooth devices 102, 103 is blinking when the Bluetooth device 102, 103 is in inquiry scan state and it is illuminated without blinking when the Bluetooth device 102, 103 is switched on and is not in inquiry scan state.

The second Bluetooth device 102 (window sensor) signals whether a window is closed, open or tilted using Bluetooth. The third Bluetooth device 103 (heating control activator) controls a heater according to a plurality of levels.

The second Bluetooth device 102 and the third Bluetooth device 103 should be connected securely to control the heating in a room depending on the state of the window. It is assumed that there is no central controlling device.

A user wanting to connect the second Bluetooth device 102 and the third Bluetooth device 103 uses a PDA which supports Bluetooth, for example. For this, the user switches the third Bluetooth device 103 into the inquiry scan state using the button. The PDA is switched into an intermediation state according to which it carries out the operation explained above with reference to FIG. 9. Accordingly, the PDA (in this case the first Bluetooth device 101) searches for other Bluetooth devices. The third Bluetooth device 103 being in inquiry scan state is being found be the first Bluetooth device 101 and is (even before the second Bluetooth device 102 has joined the piconet) selected as the (new) master for the connection to be established between the second Bluetooth device 102 and the third Bluetooth device 103.

The third Bluetooth device 103 is authenticated as explained above with reference to FIG. 7. It is assumed that the third Bluetooth device has a PIN which can not be changed and was preset during manufacture and for example comprises 8 symbols. The PIN of the third Bluetooth device can be determined by the user for example from the manual of the third Bluetooth device and is entered into the PDA by the user during the authentification process when requested. From the present data and the random number generated by the PDA the signed response (SRES) and the respected response (ERES) are determined. Further, the ciphering offset is generated during authentification.

After authentification, the first Bluetooth device 101 and the third Bluetooth device 103 negotiate a link specific key (link key) which is generated by each of the first Bluetooth device 101 and the third Bluetooth device 103.

After that, the user switches the second Bluetooth device 102 (window sensor) into inquiry scan state. Again, the PDA searches for other Bluetooth devices. Accordingly, the second Bluetooth device 102 is found by the PDA (first Bluetooth device 101). The authentification process and link key generating process are carried out analogously to the case of the third Bluetooth device 103. However, since the PINs of the second Bluetooth device 102 and the third Bluetooth device 103 are different, the link keys and offsets used by the second Bluetooth device 102 and the third Bluetooth device 103 for communication with the first Bluetooth device 101 may be different if the link keys and offsets are generated based on the respective PINs.

The completion of the establishment of the connection between the second Bluetooth device and the third Bluetooth device is then initiated by the user by a corresponding input to his PDA. The PDA generates a master key from two random numbers generated for this purpose. The master key is encrypted with the respective link key and is sent to the second Bluetooth device and the third Bluetooth device 103. Then, the PDA transfers its master role to the third Bluetooth device 103. The third Bluetooth device 103 acknowledges the role switching procedure and the first Bluetooth device 101 (PDA) leaves the piconet. The third Bluetooth device 103 sends a frequency hop synchronisation (fhs) packet to second Bluetooth device 102, which synchronises to the clock and the frequency hopping sequence of the third Bluetooth device 103 using the fhs packet. Now, the second Bluetooth device 102 and the third Bluetooth device 103 may communicate directly and securely by using the master key generated by the first Bluetooth device 101. Because of the low functionality of the second Bluetooth device 102 and the third Bluetooth device 103 the second Bluetooth device 102 and the third Bluetooth device 103 would not have been able to establish a connection with each other without the help of the first communication device 101.

Further examples for embodiments of the invention are described in the following.

Figure 10:
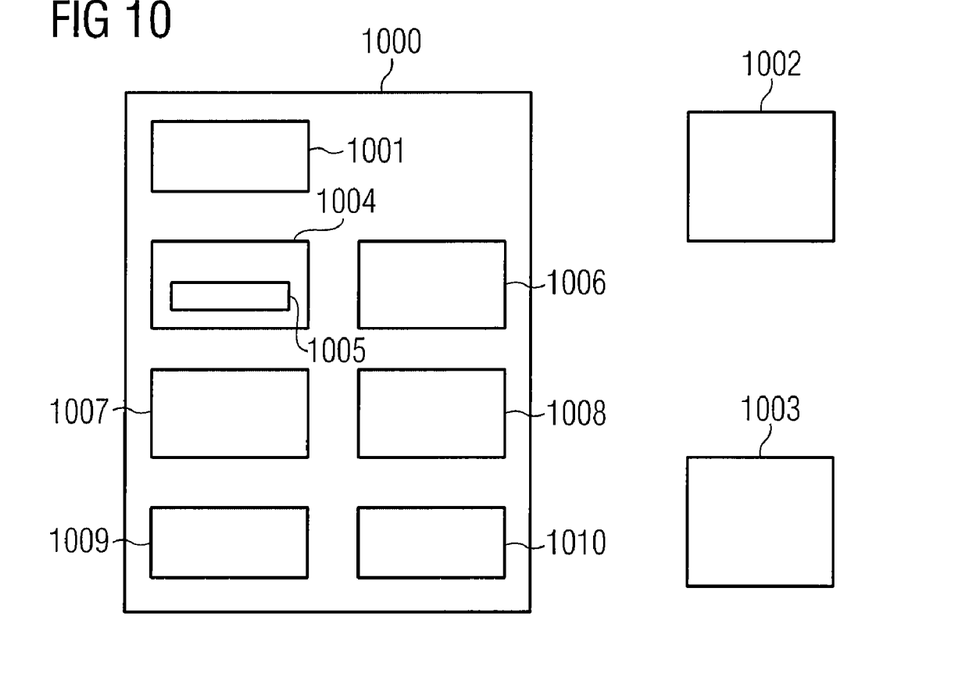
FIG. 10 shows a communication device according to an embodiment of the invention.

FIG. 10 shows a communication device 1000 according to one embodiment of the invention.

The communication device 1000 comprises a communication connection establishing circuit 1001 establishing an ad hoc network communication connection between the communication device 1000, a second communication device 1002 and a third communication device 1003. Further, the communication device 1000 comprises a generating circuit 1004 generating encryption parameters 1005 to be used by the second communication device 1002 and the third communication device 1003 for encrypting and decrypting data transmitted between the second communication device and the third communication device via the communication connection when the first communication device has left the communication connection.

The communication device 1000 comprises a signalling circuit 1010 signalling the encryption parameters to the second communication device 1002 and the third communication device 1003 and a disconnection circuit 1006 removing the communication device from the communication connection.

The communication device 1000 may control the usage of a physical channel used for the communication connection and may further comprise a selecting circuit 1007 selecting the second communication device or the third communication device as controller of the physical channel, a requesting circuit 1008 requesting the selected communication device to control the physical channel, and a handover circuit 1009 handing over the control of the physical channel to the selected communication device.

In case of Bluetooth, a special role switching procedure may be carried out in which the base channel is copied but the link specific security is kept unchanged, i.e. is not newly negotiated. This may for example be done using a master key which is used for encryption and decryption before and after the role switching.

For example, the disconnection circuit 1006 removes the communication device from the communication connection when the communication device has received an acknowledgement from the selected communication device that the selected communication device has taken over control of the physical channel.

In one embodiment, the communication devices 1000, 1002, 1003 are bluetooth devices and the communication connection is a bluetooth connection. In this case, the encryption parameters for example comprise a master key generated by the communication device.

In the case of Bluetooth devices, the communication device may be master for the communication connection and the selecting circuit 1007 may select the second communication device or the third communication device as new master for the communication connection. The requesting circuit 1008 may request the selected communication device to be the new master for the communication connection and the handover circuit 1009 may hand over the master role for the communication connection to the selected communication device.

Further, in the case of Bluetooth devices, the disconnection circuit 1006 may remove the communication device from the communication connection when the communication device has received an acknowledgement from the selected communication device that the selected communication device has taken over the master role for the communication connection.

At least one of the communication devices 1000, 1002, 1003 may be a mobile communication device.

Figure 11:
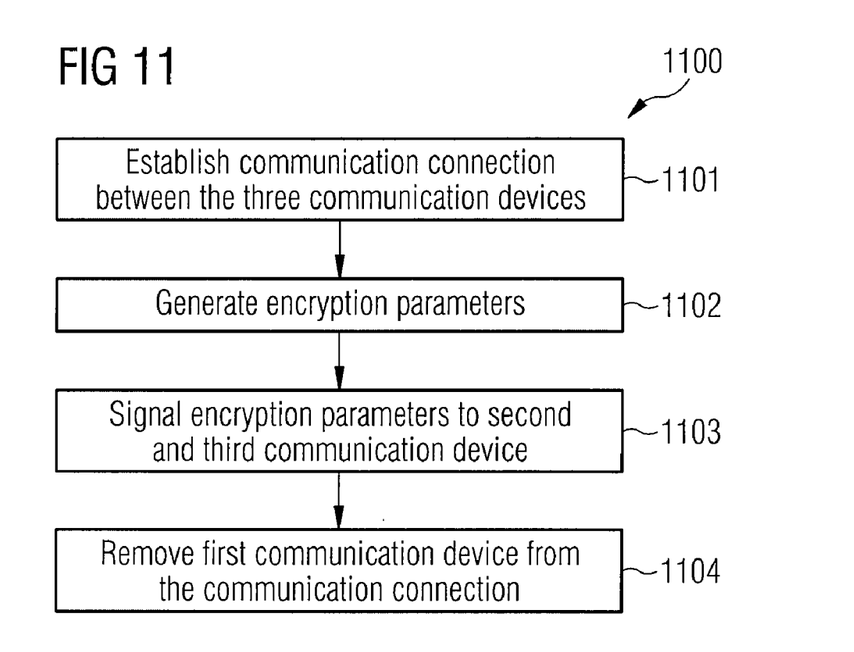
FIG. 11 shows a flow diagram according to an embodiment of the invention.

FIG. 11 shows a flow diagram according to an embodiment of the invention.

In 1101, an ad hoc network communication connection between a first communication device, a second communication device and a third communication device is established.

In 1102, encryption parameters to be used by the second communication device and the third communication device for encrypting and decrypting data transmitted between the second communication device and the third communication device via the communication connection when the first communication device has left the communication connection are generated.

In 1103, the encryption parameters are signalled to the second communication device and the third communication device.

In 1104, the communication device is removed from the communication connection.

Figure 12:
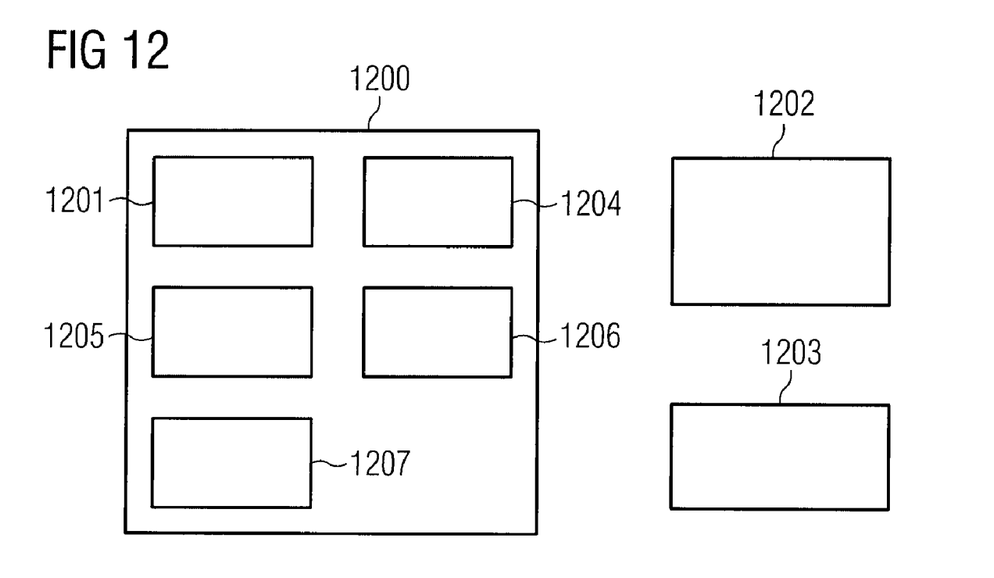
FIG. 12 shows a communication device according to an embodiment of the invention.

FIG. 12 shows a communication device 1200 according to an embodiment of the invention.

The communication device 1200 comprises a communication connection establishing circuit 1201 establishing an ad hoc network communication connection between the communication device 1200, a second communication device 1202 and a third communication device 1203.

The communication device 1200 further comprises a receiving circuit 1204 receiving encryption parameters to be used by the communication device 1200 and the second communication device 1202 for encrypting and decrypting data transmitted between the communication device 1200 and the second communication device 1202 via the communication connection when the third communication device 1203 has left the communication connection from the third communication device 1203. An encrypting/decrypting circuit 1205 of the communication device 1200 encrypts data to be sent to the second communication device 1202 via the communication connection using the encryption parameters and decrypts data received from the second communication device 1202 via the communication connection using the encryption parameters when the third communication device 1203 has left the communication connection.

The receiving circuit 1204 may further receive a request to control the physical channel of the communication connection and the communication device 1200 may take over the control of the physical channel.

The communication device 1200 may further comprise a transmitting circuit 1206 transmitting an acknowledgement to the third communication device 1203 for acknowledging that the communication device 1200 has taken over the control of the physical channel.

In one embodiment, the communication devices 1200, 1202, 1203 are bluetooth devices and the communication connection is a bluetooth connection. In this case, the encryption parameters may comprise a master key generated by the communication device.

In the case of Bluetooth devices, the receiving circuit 1204 may receive a request to take over the master role for the communication connection and the communication device 1200 may take over the master role for the communication connection. Further, the communication device 1200 may further comprise a transmitting circuit 1207 transmitting an acknowledgement to the third communication device 1203 for acknowledging that the communication device 1200 has taken over the master role for the communication connection.

Figure 13:
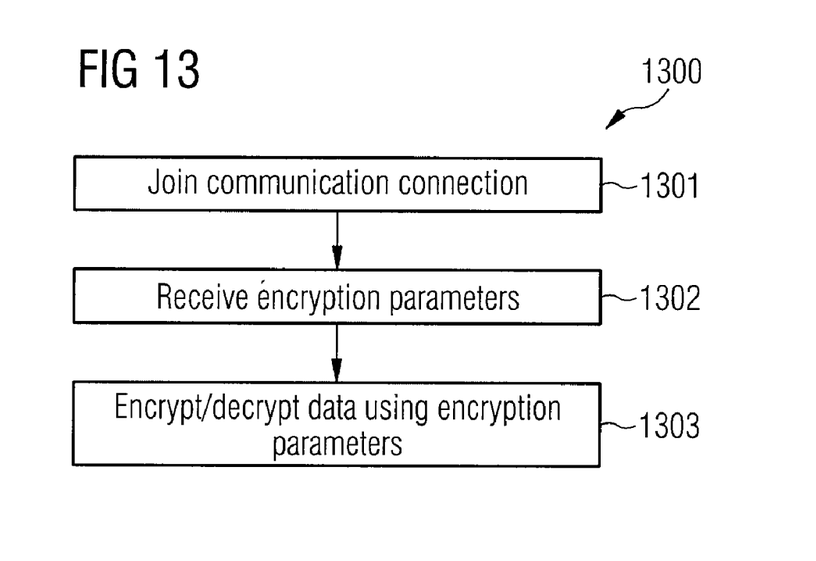
FIG. 13 shows a flow diagram according to an embodiment of the invention.

FIG. 13 shows a flow diagram 1300 according to one embodiment of the invention.

In 1301, an ad hoc network communication connection is established between a first communication device, a second communication device and a third communication device.

In 1302, encryption parameters are received from the third communication device to be used by the first communication device and the second communication device for encrypting and decrypting data transmitted between the communication device and the second communication device via the communication connection when the third communication device has left the communication connection.

In 1303, when the third communication device has left the communication connection, data to be sent to the second communication device via the communication connection is encrypted using the encryption parameters and data received from the second communication device via the communication connection is decrypted using the encryption parameters.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
  a communication connection establishing circuit configured to establish a first ad hoc network communication connection between the communication device and a second communication device and configured to establish a second ad hoc network communication connection between the communication device and a third communication device;
  a generating circuit configured to generate encryption parameters that are used in both a first piconet, the first piconet comprising the communication device, the second communication device and the third communication device, while the communication device is the master device of the first piconet, and in a second piconet, the second piconet comprising the second communication device and the third communication device, after the communication device has disconnected from the first piconet, wherein the generated encryption parameters used in the first piconet are to be used by the second communication device and the third communication device for encrypting and decrypting data transmitted between the second communication device and the third communication device in the second piconet via the communication connection when the communication device has left the first piconet;
  a signaling circuit configured to signal the encryption parameters to the second communication device via the first ad hoc network communication connection and to the third communication device via the second ad hoc network communication connection; and
  a disconnection circuit configured to release the first ad hoc network communication connection and the second ad hoc network communication connection.

2. The communication device according to claim 1, configured to control the usage of a physical channel used for the communication connection and further comprising:
  a selecting circuit configured to select the second communication device or the third communication device as controller of the physical channel;
  a requesting circuit configured to request the selected communication device to control the physical channel; and
  a handover circuit configured to hand over the control of the physical channel to the selected communication device.

3. The communication device according to claim 2, wherein the disconnection circuit releases the first ad hoc network communication connection and the second ad hoc network communication connection when the communication device has received an acknowledgement from the selected communication device that the selected communication device has taken over control of the physical channel.

4. The communication device according to claim 1, wherein the communication device, the second communication device, and the third communication device are Bluetooth devices and the communication connection is a Bluetooth connection.

5. The communication device according to claim 4, wherein the encryption parameters comprise a master key generated by the communication device.

6. The communication device according to claim 4, configured to be master for the communication connection and further comprising:
  a selecting circuit configured to select the second communication device or the third communication device as new master for the communication connection;

a requesting circuit configured to request the selected communication device to be the new master for the communication connection; and a handover circuit configured to hand over the master role for the communication connection to the selected communication device.

7. The communication device according to claim 6, wherein the disconnection circuit is configured to release the first ad hoc network communication connection and the second ad hoc network communication connection when the communication device has received an acknowledgement from the selected communication device that the selected communication device has taken over the master role for the communication connection.

8. The communication device according to claim 1, wherein at least one communication device is a mobile communication device.

9. The communication device according to claim 1, wherein the communication via the first ad hoc network communication connection is carried out in accordance with a first link key, and wherein the communication via the second ad hoc network communication connection is carried out in accordance with a second link key being different from the first link key.

10. A method for establishing a communication connection, comprising:

establishing a first ad hoc network communication connection between a first communication device and a second communication device and establishing a second ad hoc network communication connection between the communication device and a third communication device;

generating encryption parameters that are used in both a first piconet, the first piconet comprising the communication device, the second communication device and the third communication device, while the communication device is the master device of the first piconet, and in a second piconet, the second piconet comprising the second communication device and the third communication device, after the communication device has disconnected from the first piconet, wherein the generated encryption parameters used in the first piconet are to be used by the second communication device and the third communication device for encrypting and decrypting data transmitted between the second communication device and the third communication device in the second piconet via the communication connection when the first communication device has left the first piconet;

signaling the encryption parameters to the second communication device via the first ad hoc network communication connection and to the third communication device via the second ad hoc network communication connection; and releasing the first ad hoc network communication connection and the second ad hoc network communication connection.

11. The method according to claim 10, wherein the communication via the first ad hoc network communication connection is carried out in accordance with a first link key, and wherein the communication via the second ad hoc network communication connection is carried out in accordance with a second link key being different from the first link key.

12. A communication device comprising:

a communication connection establishing circuit configured to establish an ad hoc network communication connection between the communication device, a second communication device and a third communication device;

a receiving circuit configured to receive encryption parameters that are used in both a first piconet, the first piconet comprising the communication device, the second communication device and the third communication device, while the communication device is the master device of the first piconet, and in a second piconet, the second piconet comprising the communication device and the second communication device, after the third communication device has disconnected from the first piconet, wherein the generated encryption parameters used in the second piconet are to be used by the communication device and the second communication device for encrypting and decrypting data transmitted between the communication device and the second communication device in the second piconet via the communication connection when the third communication device has left the first piconet, and configured to receive a request to control the physical channel of the communication connection wherein the communication device is configured to take over the control of the physical channel of the communication connection in response to the request; and an encrypting/decrypting circuit configured to encrypt data to be sent to the second communication device via the communication connection using the encryption parameters and to decrypt data received from the second communication device via the communication connection using the encryption parameters when the third communication device has left the first piconet, and the communication device has taken over the control of the physical channel of the communication connection.

13. The communication device according to claim 12, further comprising a transmitting circuit configured to transmit an acknowledgement to the third communication device for acknowledging that the communication device has taken over the control of the physical channel.

14. The communication device according to claim 12, wherein the communication device, the second communication device, and the third communication device are Bluetooth devices and the communication connection is a Bluetooth connection.

15. The communication device according to claim 14, wherein the encryption parameters comprise a master key generated by the third communication device.

16. The communication device according to claim 14, wherein the receiving circuit is further configured to receive a request to take over the master role for the communication connection and the communication device is configured to take over the master role for the communication connection.

17. The communication device according to claim 16, further comprising a transmitting circuit configured to transmit an acknowledgement to the third communication device for acknowledging that the communication device has taken over the master role for the communication connection.

18. A method for using a communication connection comprising:

establishing an ad hoc network communication connection between a first communication device, a second communication device and a third communication device;

receiving, from the third communication device, encryption parameters that are used in both a first piconet, the first piconet comprising the communication device, the second communication device and the third communication device, while the communication device is the master device of the first piconet, and in a second piconet, the second piconet comprising the communication device and the second communication device, after the third communication device has disconnected from the first piconet, wherein the generated encryption parameters used in the second piconet are to be used by the first communication device and the second communication device for encrypting and decrypting data transmitted between the communication device and the second communication device in the second piconet via the communication connection when the third communication device has left the first piconet;

receiving, by the communication device, a request to control the physical channel of the communication connection;

taking over the control of the physical channel of the communication connection, by the communication device, in response to the request;

encrypting data to be sent to the second communication device via the communication connection using the encryption parameters when the third communication device has left the communication connection; and decrypting data received from the second communication device via the communication connection using the encryption parameters when the third communication device has left the communication connection and control of the physical channel of the communication connection has been taken over.

* * * * *